United States Patent [19]

Jones

[11] 4,323,960

[45] Apr. 6, 1982

[54] DUAL MODE DIRECT CURRENT POWER SUPPLY

[75] Inventor: Lee J. Jones, Gatlinburg, Tenn.

[73] Assignee: Ten-Tec, Inc., Sevierville, Tenn.

[21] Appl. No.: 174,004

[22] Filed: Jul. 31, 1980

[51] Int. Cl.³ ............................................. H02P 13/26
[52] U.S. Cl. ........................................ 363/48; 363/70; 363/89
[58] Field of Search ................................... 363/44–48, 363/67, 69, 70, 89, 126, 53

[56] References Cited

U.S. PATENT DOCUMENTS 3,217,233  11/1965  Drusch .................................. 363/89

FOREIGN PATENT DOCUMENTS 489183  1/1976  U.S.S.R. ............................. 363/126

Primary Examiner—William H. Beha, Jr.

Attorney, Agent, or Firm—Marshall A. Burmeister; Foster York; Francois N. Palmatier

[57] ABSTRACT

The disclosed dual mode direct current power supply comprises an AC transformer, a pair of DC output terminals, and first and second rectifier-filter circuits connected in parallel between the transformer and such terminals; the first circuit comprising first rectifiers for producing first rectified pulses, a first capacitor adapted to be charged to the peak voltage of such pulses, and an electronic voltage regulator including a series transistor; the second rectifier-filter circuit including second rectifiers for producing second rectified pulses, a choke input filter including an inductance and a second capacitor adapted to be charged through the inductance to the average voltage of the second pulses, and a series diode; the regulator causing the transistor to be nonconductive at high DC output voltage and then conductive increasingly in response to decreasing output voltage whereby the first rectifier-filter circuit supplies an increasing share of the load current.

13 Claims, 2 Drawing Figures

DUAL MODE DIRECT CURRENT POWER SUPPLY

This invention relates to a dual mode power supply for converting alternating current to direct current.

One object of the present invention is to provide a new and improved power supply of the general type which converts alternating current to direct current.

A further object is to provide such a new and improved power supply in which the direct output voltage is regulated or stabilized over an exceptionally wide range of variations in and output load current and the alternating input voltage.

Another object is to provide such a new and improved power supply which combines the advantages of an electronic voltage regulator and a choke input filter to provide an extended range of output voltage regulation.

To achieve these and other objects, the present invention preferably provides a dual mode power supply comprising power input means for receiving an alternating current input, first and second output connections for delivering direct current power, rectifier means connected with the input means for converting the alternating current input to direct current, and filter means connected between the rectifier means and the first and second output connections, such filter means comprising a first path including an electronic voltage regulator, such first path being connected between the rectifier means and the second output connection, and a second path including a filter inductance, such second path being connected between the rectifier means and the second output connection for splitting the output direct current with the first path. With this arrangement, different portions of the direct output current are carried by the first and second paths, for different conditions of the output load current and the alternating input voltage.

The input means may comprise an alternating current power transformer having a primary winding for receiving the alternating current power and a secondary winding for supplying alternating voltage. The rectifier means may include a bridge rectifier having input terminals connected to the ends of the secondary winding. Such bridge rectifier may have first and second direct current output conductors. The first output conductor may be connected to the first output connection. The second path, including the filter inductance, may be connected between the second output conductor of the bridge rectifier and the second output connection. The secondary winding may have taps for supplying a reduced alternating voltage. The rectifier means may include an additional output conductor and a pair of diode rectifiers connected between the additional output conductor and such taps. The first path, including the electronic voltage regulator, may be connected between the additional output conductor and the second output connection.

A first filter capacitor may be connected between the additional output conductor and the first output connection. A second filter capacitor may be connected between the first and second output connections.

An additional diode rectifier may be connected in series with the second path and between the filter inductance and the second output connection. A third filter capacitor may be connected between the first output connection and the junction between the filter inductance and the additional diode rectifier.

Further objects, advantages and features of the present invention will appear from the following description, taken with the accompanying drawings, in which.

Figure 1:
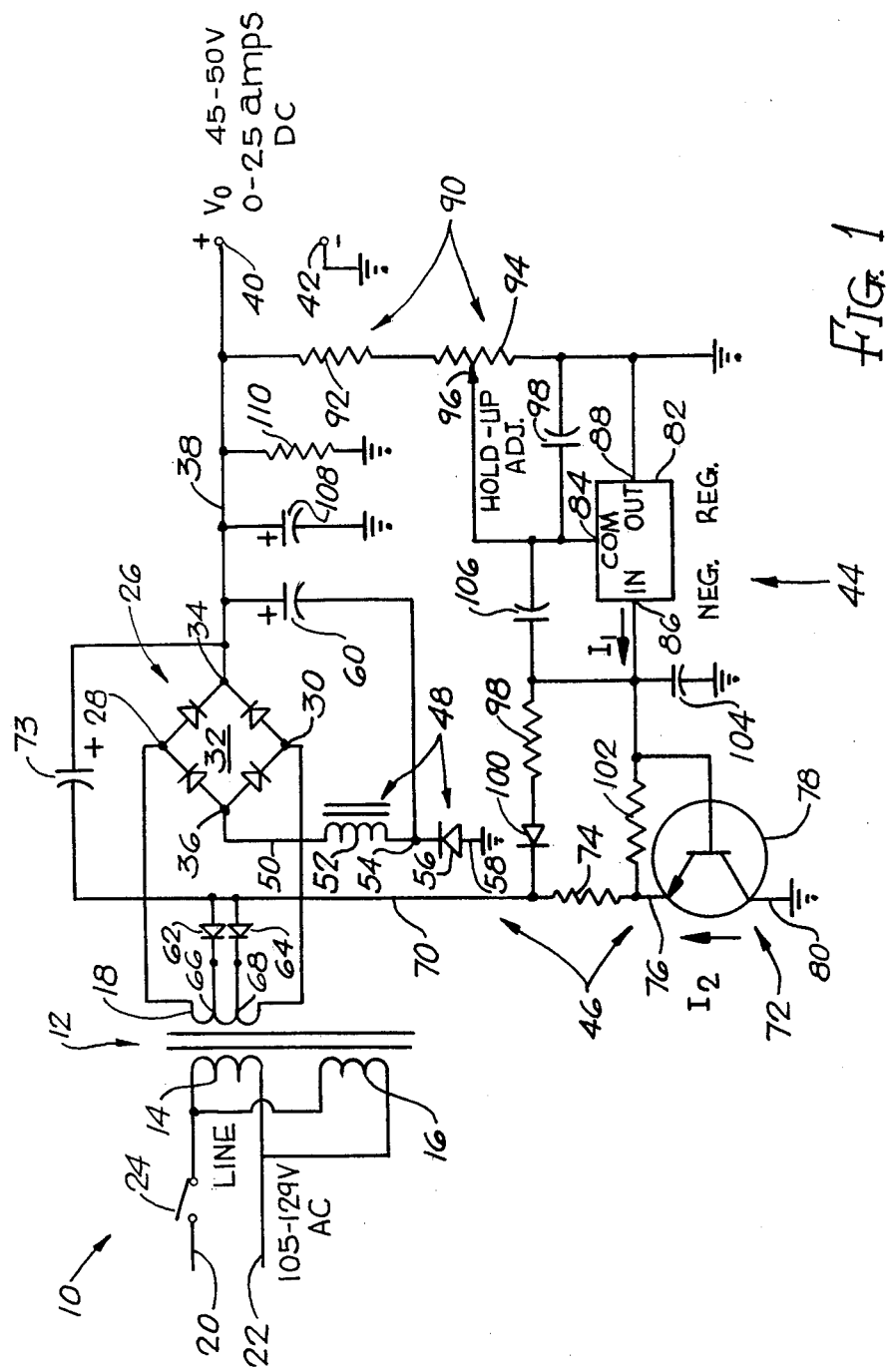
FIG. 1 is a simplified schematic circuit diagram of a dual mode direct current power supply to be described as an illustrative embodiment of the present invention.

As just indicated, FIG. 1 illustrates a dual mode power supply 10, adapted to convert alternating current into direct current. This particular power supply 10 is adapted to receive alternating current input power at a nominal line voltage of either 115 volts or 230 volts, and to deliver direct current output power at a regulated voltage of 45 to 50 volts, with a full load output current of 25 amperes.

As shown in FIG. 1, the power supply 10 is connected to receive alternating current at a nominal line voltage of 115 volts, which may actually vary from 105 to 129 volts. To provide the desired output voltage, the power supply 10 includes a power transformer 12 having two primary or input windings 14 and 16 and a secondary or output winding 18. In this case, the primary windings 14 and 16 are connected in parallel to the alternating current input lines or terminals 20 and 22, through a line switch 24. The power transformer 12 and the associated components comprise input means for receiving the alternating current input, and for converting it to the desired voltage.

The secondary winding 18 of the power transformer 12 is connected to rectifier means 26 for rectifying the alternating current to produce pulsating direct current. As shown in FIG. 1, the ends of the secondary winding 18 are connected to the input terminals or conductors 28 and 30 of a bridge rectifier 32 which produces full wave rectification of the alternating current. Pulsating direct current is produced at the output terminals or conductors 34 and 36 of the bridge rectifier 32. In this case, the polarity of the terminal 34 is positive, while the polarity of the terminal 36 is negative.

By means of a conductor or lead 38, the positive terminal 34 of the bridge rectifier 32 is connected to a first output connection 40 which serves as the positive output terminal of the power supply 10. A negative output connection or terminal 42 is also provided and is connected to ground in this instance.

Filter means 44 are connected between the rectifier means 26 and the output terminals 40 and 42 of the power supply 10. The pulsating portion of the pulsating direct current is removed by such filter means 44, so that a steady direct current is produced at the output terminals 40 and 42.

The filter means 44 include first and second paths 46 and 48 connected between the rectifier means 26 and the second output terminal 42. For convenience, the second path 48 will be described at this time, while the first path 46 will be described later.

As shown in FIG. 1, the second path 48 is in the form of a series circuit connected between the output terminal 36 of the bridge rectifier 32 and ground, which in turn is connected to the negative output terminal 42 of the power supply 10. Starting from the terminal 36, the second path or series circuit 48 includes a conductor 50, a filter inductance or choke coil 52, a conductor 54, a diode rectifier 56, and a conductor 58, leading to ground. A filter capacitor 60 is connected between the positive output line 38 and the junction conductor 54, extending between the inductance coil 52 and the diode rectifier 56. The combination of the inductance coil 52 and the filter capacitor 60 constitutes a choke input filter circuit which very largely removes or attenuates the pulsating portion of the direct current, so that the output supplied to the output terminals 40 and 42 is very nearly a steady direct current. It has been found that the provision of the diode rectifier 56 improves the stability of the dual mode power supply 10.

As shown in FIG. 1, the rectifier means 26 include a pair of additional diode rectifiers 62 and 64 connected to a pair of taps 66 and 68 on the secondary winding 18 of the power transformer 12. The taps 66 produce an alternating voltage therebetween, which is somewhat less than the alternating voltage between the ends of the secondary winding 18. The diode rectifiers 62 and 64 are connected between an additional output conductor 70 and the taps 66 and 68. The additional output conductor 70 is connected into the first path 46, which also includes an electronic voltage regulator circuit 72. It will be understood that the electronic voltage regulator circuit 72 also serves as a filter circuit which very largely removes or attenuates the pulsating portion of the direct current.

At the input end of the first path 46, a filter capacitor 73 is connected between the conductor 70 and the common conductor 38, leading to the positive output terminal 40 of the power supply 10. This capacitor 73 has a filtering effect, which reduces the pulsating portion of the direct voltage between the conductors 38 and 70. The capacitor 73 also has a storage effect which increases the direct voltage between the conductors 38 and 70.

Starting from the conductor 70, the first path 46 takes the form of a series circuit comprising a resistor 74, a conductor 76, a power transistor 78, and a conductor 80, leading to ground, which in turn is connected to the negative output terminal 42 of the power supply 10. The emitter and the collector of the transistor 78 are connected to the conductors 76 and 80, respectively. As will be described in connection with FIG. 2, the transistor 78 may actually comprise a number of power transistors in parallel, to achieve the desired current rating. The transistor 78 is a component of the electronic voltage regulator circuit 72, which varies the effective series resistance of the transistor 78, in order to regulate the direct voltage between the output terminals 40 and 42.

The electronic voltage regulator circuit 72 also includes an integrated circuit or module 82, which may be a standard 15 volt negative-side regulator module, type 7915. As shown, the integrated circuit 82 has a common terminal 84, an input terminal 86, and an output terminal 88. The integrated regulator circuit 82 tends to produce a regulated voltage of 15 volts between the output terminal 88 and the common terminal 84.

In order to provide for a higher regulated voltage of 45 to 50 volts between the output terminals 40 and 42, the voltage regulator circuit 72 includes an adjustable voltage divider 90, comprising a fixed resistor 92 and a potentiometer 94, connected in series between the positive output terminal 40 and ground, to which the negative output terminal 42 is connected. The output terminal 88 of the integrated circuit 82 is also connected to ground. The potentiometer 94 has a slider 96 which is connected to the common terminal 84 of the integrated circuit 82. By suitably adjusting the slider 96, the voltage between the slider 96 and the ground may be 15 volts, while the voltage between the terminals 40 and 42 is 45 to 50 volts. A filter capacitor 98 is connected between the common terminal 84 and ground.

A resistor 98 and a diode rectifier 100 are connected in series between the input terminal 86 of the integrated circuit 82 and the conductor 70 at the beginning of the first path 46. The input terminal 86 of the integrated regulator circuit 82 is also connected directly to the base of the power transistor 78. A resistor 102 is connected between the base and the emitter of the transistor 78. A filter capacitor 104 is connected between the input terminal 86 and ground. Another filter capacitor 106 is connected between the input terminal 86 and the common terminal 84.

With this arrangement of the electronic voltage regulator 72, the integrated voltage regulator circuit 82 varies the effective series resistance of the power transistor 78, in a manner such as to stabilize the output voltage between the terminals 40 and 42. If the alternating input voltage increases, the effective series resistance of the power transistor 78 is increased, so as to prevent any substantial increase in the output voltage between the terminals 40 and 42. If the output load current increases, the effective series resistance of the transistor 78 is decreased, so as to obviate any significant decrease in the output voltage.

In FIG. 1, a filter capacitor 108 is connected between the positive output terminal 40 and the grounded negative terminal 42. A bleeder resistor 110 is also connected between the terminals 40 and 42. The bleeder resistor 110 draws a minimum current, even when the external load current is reduced to zero.

The output or load current flowing through the external load between the output terminals 40 and 42, is split between the first and second paths 46 and 48. The second path 48, which includes the choke coil 52, provides additional current carrying capacity, to supplement the current carrying capacity of the electronic voltage regulator circuit 72. Thus, the maximum output current of the regulated power supply 10 is increased.

At a high output current corresponding to full load, the output voltage is established and regulated by the electronic voltage regulator circuit 72 in the first path 46. When the alternating input voltage is near the low end of its rated range, the effective resistance of the power transistor 78 is adjusted automatically to a low value, to sustain the output voltage. If the alternating input voltage is increased, the effective resistance of the power transistor 78 is automatically increased, to stabilize the output voltage. This change has the effect of shifting a greater portion of the output current to the second path 48, which includes the filter choke coil 52.

When the output load current is decreased from its full load value, the effective resistance of the power transistor 78 is increased to stabilize the output voltage. This again has the effect of shifting a greater portion of the output current to the second path 48, which includes the choke coil 52. At extremely low values of load current, most or all of the load current may be carried by the second path 48, and the output voltage may rise appreciably above the regulated voltage level normally maintained by the electronic voltage regulator 72. However, the rise in the output voltage is minimized by the favorable regulating characteristics of the choke input filter, represented by the second path 48.

Figure 2:
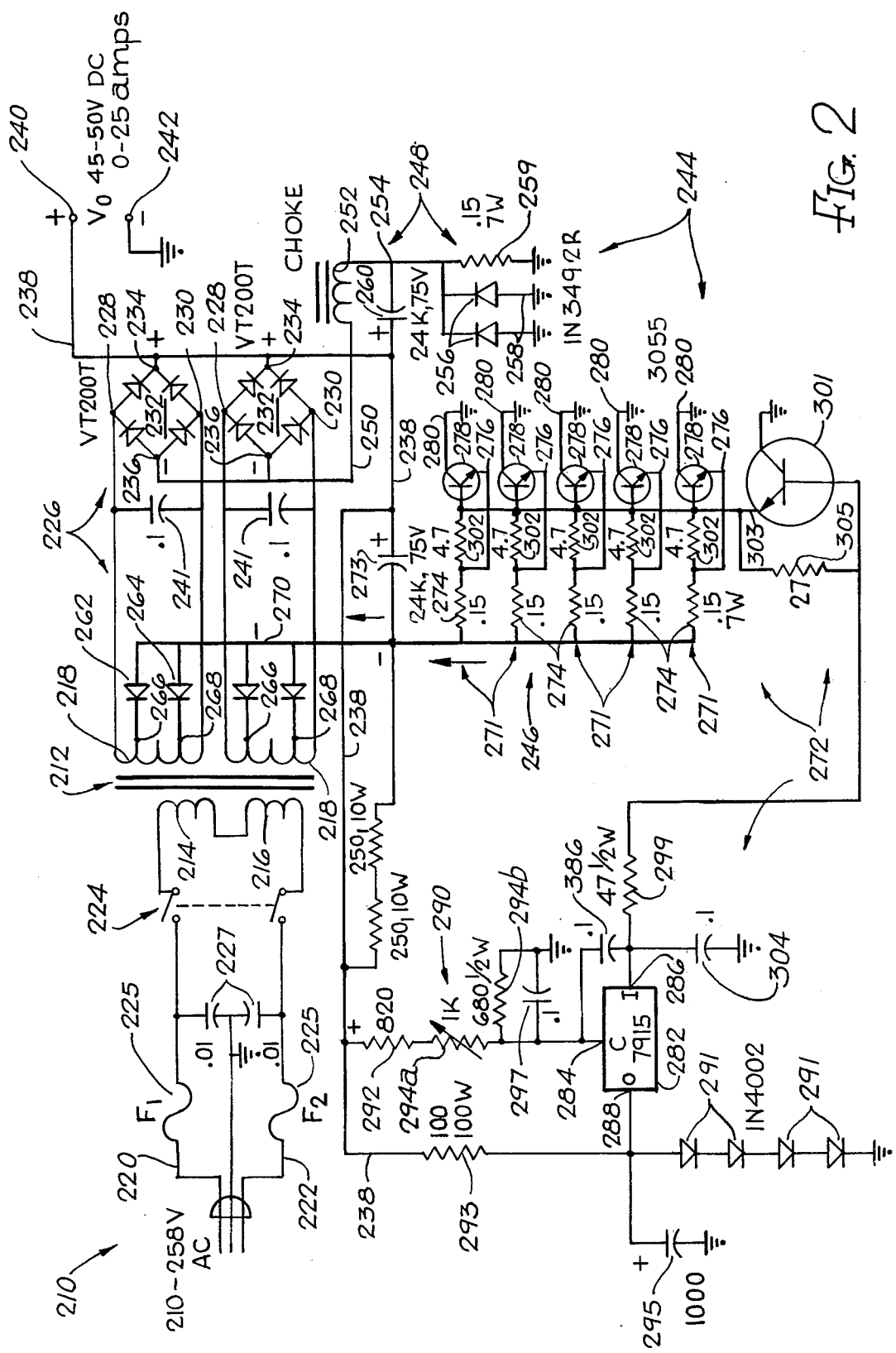
FIG. 2 is a detailed circuit diagram of a modified, more elaborate dual mode power supply.

FIG. 2 illustrates a modified dual mode power supply 210 which is an elaboration of the power supply 10 of FIG. 1. The power supply 210 of FIG. 2 is adapted to receive alternating current input power at a nominal line voltage of either 115 or 230 volts, and to deliver direct current output power at a regulated voltage of 45 to 50 volts, with a full load output current of approximately 25 amperes.

As shown in FIG. 2, the power supply 210 is connected to receive alternating current having a nominal line voltage of 230 volts, which may actually vary from 210 to 258 volts. To provide the desired output voltage, the power supply 210 includes a power transformer 212 having two primary or input windings 214 and 216 which are connected in series to the alternating current input lines or terminals 220 and 222, through a double pole line switch 224 and a pair of fuses 225. A line filter is provided by capacitors 227 of small value, connected between each of the lines 220 and 222 and ground. It will be understood that the primary windings 214 and 216 may be reconnected so that they are in parallel, if it is desired to employ a nominal alternating current input voltage of 115 volts.

The power transformer 212 and the associated components comprise input means for receiving the alternating current input, and for converting it to the desired voltage. In this case, the power transformer 212 has a pair of secondary windings 218 which are connected to rectifier means 226 for rectifying the alternating current to produce pulsating direct current. As shown in FIG. 2, the ends of each secondary winding 218 are connected to the corresponding input terminals or conductors 228 and 230 of a corresponding bridge rectifier 232 which produces full wave rectification of the alternating current. A separate bridge rectifier 232 is provided for each secondary winding 218. Pulsating direct current is produced at the output terminals or conductors 234 and 236 of each bridge rectifier 232. In this case, the polarity of the terminal 234 is positive, while the polarity of the terminal 236 is negative.

In the circuit of FIG. 2, the outputs of the two bridge rectifiers 232 are connected in parallel. Thus, the positive output terminals 234 of both bridge rectifiers 232 are connected together by a conductor or lead 238 which extends to a first output connection 240, serving as the positive output terminal of the power supply 210. A negative output connection or terminal 242 is also provided and is connected to ground in this instance.

Separate capacitors 241 of a relatively low value are connected across both secondary windings 218, to bypass unwanted high frequency signals.

Filter means 244 are connected between the rectifier means 226 and the output terminals 240 and 242 of the power supply 210. The pulsating portion of the pulsating direct current is substantially removed by such filter means 244 so that a substantially steady direct current is produced at the output terminals 240 and 242.

The filter means 244 include first and second paths 246 and 248 connected between the rectifier means 226 and the second output terminal 242, which in this case is negative in polarity and is grounded. For convenience, the second path 248 will be described at this time, while the first path 246 will be described later.

As shown in FIG. 2, the second path 248 is in the form of a series circuit connected between the negative output terminals 236 of both bridge rectifiers 232 and ground, which in turn is connected to the negative output terminal 242 of the power supply 210. Starting from the terminals 236, the second path or series circuit 248 includes a conductor 250, connected to both terminals 236, a filter inductance or choke coil 252, a conductor 254, two diode rectifiers 256 connected in parallel, and conductors 258 leading to ground. A resistor 259 is also connected in parallel with the diode rectifiers 256. It will be understood that two diode rectifiers 256 are employed to provide the desired current carrying capacity.

A filter capacitor 260 is connected between the positive output line 238 and the junction conductor 254, extending between the inductance coil 252 and the diode rectifiers 256. The combination of the inductance coil 252 and the filter capacitor 260 constitutes a choke input filter circuit which very largely removes or attenuates the pulsating portion of the direct current, so that the output supplied to the output terminals 240 and 242 is very nearly a steady direct current. It has been found that the provision of the diode rectifiers 256 improves the stability of the dual mode power supply 210.

As shown in FIG. 2, the rectifier means also include two pairs of additional diode rectifiers 262 and 264. Each secondary winding 218 of the power transformer 212 has a pair of taps 266 and 268 to produce an alternating voltage which is somewhat less than the alternating voltage between the ends of the secondary winding 218. A separate set of the diode rectifiers 262 and 264 is provided for each secondary winding 218. In each case, the diode rectifiers 262 and 264 are connected between an additional output conductor 270 and the respective taps 266 and 268 on the corresponding secondary winding 218. The additional output conductor 270 is connected into the first path 246, which also includes an electronic voltage regulator circuit 272, also serving as a filter circuit which very largely removes or attenuates the pulsating portion of the direct current.

At the input end of the first path 246, a filter capacitor 273 is connected between the conductor 270 and the common positive conductor 238, leading to the positive output terminal 240 of the power supply 210. This capacitor 273 has a filtering effect, which reduces the pulsating portion of the direct voltage between the conductors 238 and 270. The capacitor 273 also has a storage effect which increases the direct voltage between the conductors 238 and 270.

In addition to the conductor 270, the first path 246 comprises a plurality of parallel circuits or subpaths 271, connected between the conductor 270 and ground. Each subpath 271 takes the form of a series circuit comprising a resistor 274, a conductor 276, a power transistor 278 and a conductor 280, leading to ground, which in turn is connected to the negative output terminal 242 of the power supply 210. The emitter and the collector of each transistor 278 are connected to the corresponding conductors 276 and 280, respectively. In this case, there are five subpaths 271, each containing a separate power transistor 278. In effect, the five transistors 278 are in parallel. The resistors 274 have the effect of equalizing the currents in the transistors 278, so that the total current is divided evenly among the transistors. It will be understood that a plurality of the power transistors 278 are provided, to achieve the desired current rating. The transistors 278 are components of the electronic voltage regulator circuit 272, which varies the effective series resistance of the first path 246, in order to regulate the direct voltage between the output terminals 240 and 242.

The electronic voltage regulator circuit 272 also includes an integrated circuit or module 282, which may be a standard 15 volt negative-side regulator module, type 7915. As shown, the integrated circuit 282 has a common terminal 284, an input terminal 286 and an output terminal 288. The integrated regulator circuit 282 tends to produce a regulated voltage of 15 volts between the output terminal 288 and the common terminal 284, when a voltage exceeding 15 volts is supplied between the input terminal 286 and the common terminal 284.

In order to provide for a higher regulated voltage of 45 to 50 volts between the output terminals 240 and 242, the voltage regulator circuit 272 includes an adjustable voltage divider 290, comprising a fixed resistor 292, a variable resistor 294a, and a fixed resistor 294b, connected in series between the positive output terminal 240 and ground, to which the negative output terminal 242 is connected. The common terminal 284 of the integrated voltage regulator circuit 282 is connected to the junction conductor 296 between the variable resistor 294a and the fixed resistor 294b.

The output terminal 288 of the voltage regulator circuit 282 is given a small positive biasing voltage, relative to ground, by connecting a plurality of diode rectifiers 291 in series between the output terminal 288 and ground. In this case, there are four of the diode rectifiers 291, connected in series, but the number may be varied, to provide the desired biasing voltage. To provide a biasing current through the diode rectifiers 291, a resistor 293 is connected between the positive supply lead 238 and the output terminal 288 of the integrated voltage regulator circuit 282. It will be recalled that the supply lead 238 is connected to the positive output terminal 240. In this case, a filter capacitor 295 is also connected between the output terminal 288 and ground.

It will be seen that a capacitor 297 of a relatively small value is connected between the common terminal 284 and ground, to bypass unwanted high frequency signals.

In the circuit of FIG. 2, a resistor 299 is connected between the input terminal 286 of the integrated voltage regulator circuit 282 and the base of an amplifying transistor 301 having its collector connected to ground. The emitter of the transistor 301 is connected to the bases of all of the power transistors 278 by a lead 303. A resistor 305 is connected between the base and the emitter of the transistor 301. As to each of the power transistors 278, a separate resistor 302 is connected between the base and the emitter of the transistor. It will be seen that the emitter of the amplifying transistor 301 is connected to the negative supply conductor 270 by five parallel paths, each comprising one of the resistors 274 and one of the resistors 302, connected in series. The five parallel paths provide a composite load resistance in the emitter circuit for the amplifying transistor 301.

A filter capacitor 304 is connected between the input terminal 286 and ground, to bypass unwanted high frequency signals. Another filter capacitor 306 is connected between the input terminal 286 and the common terminal 284 of the integrated voltage regulator circuit 282.

With this arrangement of the electronic voltage regulator 272, the integrated voltage regulator circuit 282 varies the effective series resistance of the power transistors 278, in a manner such as to stabilize the output voltage between the output terminals 240 and 242. The power transistors 278 are effectively in parallel. The amplifying transistor 301 serves as a driver for the power transistors 278. If the alternating input voltage increases, the effective series resistance of the power transistors 278 is increased, so as to prevent any substantial increase in the output voltage between the terminals 240 and 242. If the output load current increases, the effective series resistance of the transistors 278 is decreased by the action of the integrated voltage regulator circuit 282, so as to obviate any significant decrease in the output voltage.

In FIG. 2, a pair of bleeder resistors 310 are connected in series between the positive supply lead 238 and the negative supply lead 270, to draw a minimum current. The series combination of the resistor 293 and the diodes 291 also draws a minimum current.

The output of load current flowing through the external load between the output terminals 240 and 242 is split between the first and second paths 246 and 248. The second path 248, which includes the choke coil 252, provides additional current carrying capacity, to supplement the current capacity of the electronic voltage regulator circuit 272. Thus, the maximum output current of the regulated power supply 210 is increased.

At a high output current corresponding to full load, the output voltage between the output terminals 240 and 242 is established and regulated by the electronic voltage regulator circuit 272 in the first path 246. When the alternating input voltage is near the low end of its rated range, the effective resistance of the power transistors 278 is adjusted automatically to a low value, to sustain the output voltage. If the alternating input voltage is increased, the effective resistance of the power transistors 278 is automatically increased, to stabilize the output voltage. This change has the effect of shifting a greater portion of the output current to the second path 248, which includes the filter choke coil 252.

When the output load current is decreased from its full load value, the effective resistance of the power transistors 278 is automatically increased to stabilize the output voltage. This again has the effect of shifting a greater portion of the output current to the second path 248, which includes the choke coil 252. At extremely low values of load current, most or all of the load current may be carried by the second path 248, and the output voltage may rise appreciably above the regulated voltage level normally maintained by the electronic voltage regulator 272. However, the rise in the output voltage is minimized by the favorable regulating characteristics of the choke input filter, comprising the choke coil 252 and the filter capacitor 260, in the second path 248.

In the dual mode power supply 210 of FIG. 2, the regulated output voltage between the output terminals 240 and 242 can be varied by adjusting the variable resistor 294a in the voltage regulating circuit 272. This adjustment changes the ratio between the d.c. output voltage and the 15 volt regulated output of the voltage regulator module 282.

It will be understood that the values of the resistors and capacitors and the type designations of the solid state devices, employed in the power supply 210 of FIG. 2, may be varied to suit different operating conditions and needs. Those skilled in the art will be able to assign suitable values and type designations to the various components. However, for the possible assistance of those skilled in the art, FIG. 2 has been marked with one set of suggested values and type designations.

I claim:

1. A dual mode power supply, comprising power input means for providing alternating current power;

a pair of direct current output conductors;

and first and second rectifier-filter means connected between said power input means and said direct current output conductors;

said first and second rectifier-filter means being connected in parallel across said direct current output conductors;

said first rectifier-filter means comprising first rectifier means for producing first rectified voltage pulses, a first filter capacitor connected across the output of said first rectifier means and adapted to be charged by said first rectified voltage pulses, and electronic voltage regulator means including series transistor means connected between said first filter capacitor and said direct current output conductors;

said second rectifier-filter means including second rectifier means for producing second rectified voltage pulses, a choke input filter connected to the output of said second rectifier means and including a filter inductance and a second filter capacitor adapted to be charged through said filter inductance to the average value of said second rectified voltage pulses;

said voltage regulator means causing said series transistor means to be substantially nonconductive for normal alternating current input voltage and low output load conditions;

said second rectifier-filter means being effective to supply output voltage and current under conditions of normal alternating current input voltage and low output load;

said first rectifier-filter means producing a higher output voltage than said second rectifier-filter means;

said voltage regulator means causing said transistor means to be conductive increasingly in response to decreasing output voltage across said output conductors due to increasing load or decreasing alternating current input voltage whereby an increasing share of the direct current output power is supplied by said first rectifier-filter means.

2. A dual mode power supply according to claim 1, said second rectifier-filter means including a series diode rectifier connected between one side of said second filter capacitor and one of said direct current output conductors.

3. A dual mode power supply according to claim 2, including an additional filter capacitor connected across said direct current output conductors.

4. A dual mode power supply according to claim 2, including a shunting resistance connected across said series diode rectifier.

5. A dual mode power supply according to claim 1, including means for supplying a somewhat lower alternating voltage to said first rectifier means than to said second rectifier means.

6. A dual mode power supply according to claim 1, said power input means comprising a transformer having a tapped secondary winding for supplying full alternating voltage to said second filter means while supplying a somewhat reduced alternating voltage to said first rectifier means.

7. A dual mode power supply according to claim 1, said power input means including a transformer having a secondary winding for supplying full alternating voltage to said second rectifier means, said secondary winding having taps connected to said first rectifier means for supplying a somewhat reduced alternating voltage thereto.

8. A dual mode power supply, comprising power transformer means for providing alternating current power, a pair of direct current output terminals, said first and second rectifier-filter means connected between said power transformer means and said direct current output terminals;

said first and second rectifier-filter means being connected in parallel across said direct current output terminals;

said first rectifier-filter means comprising first rectifier means for producing first rectified voltage pulses, a first filter capacitor connected across the output of said first rectifier means and adapted to be charged to the peak value of said first rectified voltage pulses, and electronic voltage regulator means including series transistor means connected between said first filter capacitor and said direct current output terminals;

said second rectifier-filter means including second rectifier means for producing second rectified voltage pulses, a choke input filter connected to the output of said second rectifier means and including a filter inductance and a second filter capacitor adapted to be charged through said filter inductance to the average value of said second rectified voltage pulses, and a series diode rectifier connected between one side of said second filter capacitor and one of said direct current output terminals;

said voltage regulator means causing said transistor means to be substantially nonconductive for normal alternating current input voltage and low output load conditions;

said second rectifier-filter means being effective to supply substantially the entire output voltage and current under conditions of normal alternating current input voltage and low output load;

said first rectifier-filter means producing a higher output voltage than said second rectifier-filter means;

said voltage regulator means causing said transistor means to be conductive increasingly in response to decreasing output voltage across said output terminals due to increasing load or decreasing alternating current input voltage.

9. A dual mode power supply according to claim 8, including an additional filter capacitor connected across said direct current output terminals.

10. A dual mode power supply according to claim 8, said second rectifier means comprising a bridge rectifier connected between said transformer means and said choke input filter.

11. A dual mode power supply according to claim 8, said transformer means comprising primary and secondary windings, said second rectifier means comprising a bridge rectifier connected between said secondary winding and said choke input filter, said secondary winding having a pair of taps affording a somewhat reduced voltage,
said first rectifier means comprising a pair of diode rectifiers connected between said taps and said first filter capacitor.

12. A dual mode power supply according to claim 8, including a shunting resistance connected across said series diode rectifier.

13. A dual mode power supply according to claim 8, said transformer means comprising means for supplying a somewhat greater voltage to said second rectifier means than to said first rectifier means.

* * * * *